United States Patent [19]
Abalo

[11] 3,778,018
[45] Dec. 11, 1973

[54] MOLD STRUCTURE
[75] Inventor: Juan Manuel Abalo, Buenos Aires, Argentina
[73] Assignee: Noel Y Compania Limitada Sociedad Anonima Argentina de Dulces Y Conservas, Buenos Aires, Argentina
[22] Filed: July 22, 1971
[21] Appl. No.: 165,065

[52] U.S. Cl.................. 249/120, 249/134, 249/119, 425/453
[51] Int. Cl............................................. A23g 1/22
[58] Field of Search.................... 249/119, 134, 117, 249/120, 205, 203, 69, 70, 132; 425/DIG. 17, 168, 453, 447, 261; 164/329; 220/85 K; 198/195

[56] References Cited
UNITED STATES PATENTS

| | | | |
|---|---|---|---|
| 1,908,323 | 5/1933 | Corbett............................ | 249/127 X |
| 1,831,047 | 11/1931 | Thomas........................... | 249/120 X |
| 3,502,237 | 3/1970 | Verhein et al..................... | 220/4 |
| 1,274,764 | 8/1918 | Perderson......................... | 220/85 K |
| 3,478,998 | 11/1969 | Buford............................. | 249/117 X |
| 2,182,454 | 12/1939 | Sherman.......................... | 249/127 X |
| 2,037,821 | 4/1936 | Prabell............................. | 249/205 |
| 2,811,933 | 11/1957 | Prasz................................ | 425/453 |
| 2,240,214 | 4/1941 | Heidelmeyer et al.............. | 425/447 |

FOREIGN PATENTS OR APPLICATIONS
712,799    9/1966    Italy.................................... 249/119

Primary Examiner—J. Spencer Overholser
Assistant Examiner—David S. Safran
Attorney—Karl W. Flocks

[57] ABSTRACT

Molds used for producing foamed chocolate are subject to wear and impacts by conveyors and therefore must be provided with reinforcing means including corner reinforcing members and a grid rib arrangement below the molding cavities, said grid rib also providing rails for sliding the molds along a runway, and the conveyor must guide the molds through pressurized and non-pressurized zones, so that the conveyor must include sealing members which are also adapted to push the molds and simultaneously provide the necessary sealing.

8 Claims, 7 Drawing Figures

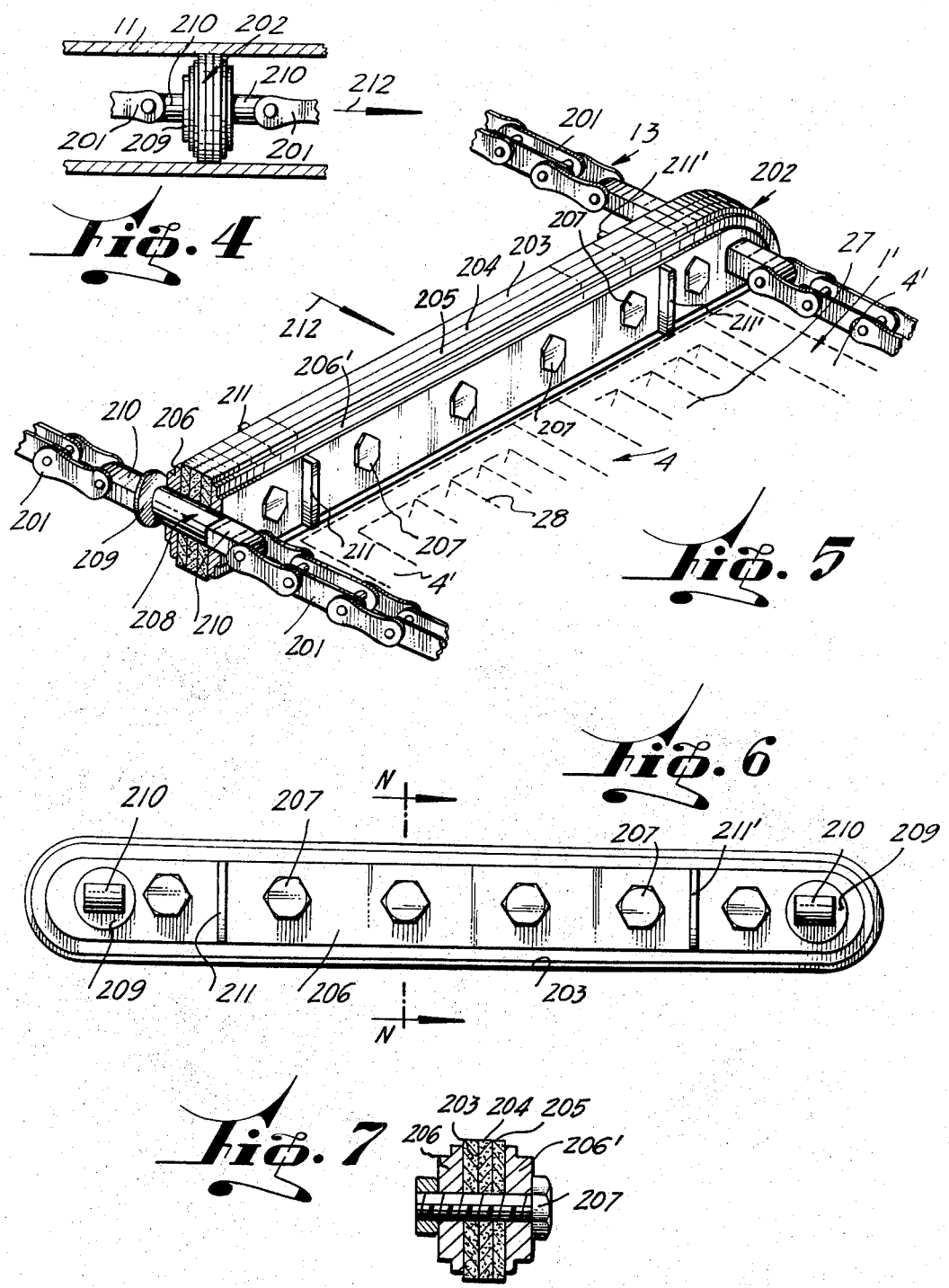

MOLD STRUCTURE

BACKGROUND OF THE INVENTION

FIELD OF THE INVENTION

The present invention relates to a mold structure and conveying means therefor and more particularly this arrangement is preferably used for producing sweets or candies where the core portion is of foamed or alveolar structure.

The expressions "sweet" and "candy", for the purpose of this specification and the appendant claims are to be interpreted as meaning an edible product which is sweet and delicious to the palate. In a preferred use the arrangement is employed for producing chocolate tablets, the core portion of which is of foamed chocolate.

In the manufacture of sweets of the type hereinabove cited and specially when they are manufactured by a continuous process, the molds have to pass through a series of treatment stations and to this end, conveying means of different types are provided. In some parts of such a continuous process the movement of these molds is performed by chains which are located below the mold to convey the mold. When the chains begin to contact the mold to move the mold due to the differences in potential and kinetic energy of the stationary molds with regard to the moving chains, friction is encountered and there-by resulting in a premature wear of the portions in frictional contact, particularly of the molds. Furthermore, it also happens in a number of processes that the molds have to be transferred from one endless conveyor to another, at different levels. The movement from one level to the next lower one is performed through sloped guide means, whereby impacts are unavoidable, and said impacts tend to deform the mold structure.

The molds are to be conveyed through zones and/or stations by pushing members, so that during such movement the molds have to slide along stationary runways. In this event it becomes desirable to reduce the friction coefficient to a minimum to thus achieve the movement of the mold with a minimum of energy and in addition the molds should be of a particular design to avoid that the runways will be damaged and/or worn out, since these runways have to operate in combination with sealing means which at the same time have to be the pusher devices for the molds and if these runways would be worn out, the sealing means would become inoperative.

With regard to the conveying means which include sealing means, these are necessary in order to be able to convey the molds from a first ambient at a predetermined pressure, to a second ambient at a higher or lower pressure than the first ambient and from said second ambient after the mass in the mold having been treated therein, back to the first ambient.

The conveying means are provided with sealing means to maintain both ambients sealed apart and yet to provide an arrangement, whereby the molds may be continuously conveyed along a path from the first ambient through the second ambient and back to the first ambient. More particularly, this invention includes pressure sealed conveying means which will convey molds into and/or out of a space which is under pressure, above or below atmospheric pressure, without permitting blow back or escape of air or gases of the ambient which is above or below atmospheric pressure.

The invention is preferably, although not exclusively, applied to a process for manufacturing foamed chocolate, where the mold is charged in the first ambient, at atmospheric pressure, with a flowable, pasty, plastic, warm mass containing bubbles and then transferred to a vacuum zone where the bubbles contained in the mass of the mold are allowed to expand in order to produce a foamed material, such as foamed chocolate and in said second ambient said pasty warm mass is also allowed to cool, to harden and to be then discharged from said vacuum zone, which is a chamber, back to the ambient at atmospheric pressure to be subject to further treatments.

To this end the vacuum chamber is provided with a tubular inlet nozzle member and a tubular outlet nozzle member and the conveying means have to move each mold from the first ambient at atmospheric pressure through the inlet nozzle member to the second ambient which is the vacuum chamber and then after having passed through the vacuum chamber through the outlet nozzle member back to the first ambient. These molds should move substantially continuously and therefore the conveying means must be provided with suitable sealing means which enable such continuous movement and yet maintain the low pressure in the vacuum chamber. In addition, the conveying means must be so conceived that they are suitable for conveying the molds.

In order to achieve this purpose, the sealing means forming part of the conveying means must be of a peculiar structure and in addition they should be provided with adjustment means which enable to increase the size of the sealing means by a simple operation, if these sealing means, after a prolonged use, become worn out, to recreate the correct sealing properties.

DESCRIPTION OF PRIOR ART

Pressure sealed conveying apparatus have already been suggested, where the conveyor consists of an endless flexible member carrying yieldable flights of rubber-like material which are disc-shaped and the endless flexible member passes through the middle portions of these flights, so that they are only suitable to transport granular loose material between pairs of flights and the entire arrangement must be stopped and dis-assembled each time one of the flights becomes inoperative.

It will be evident to those skilled in the art that these known arrangements are not suitable for conveying molds because the flights cannot exert at the same time a strong pushing force on the molds, since these rubber flights would thereby be bent and lose the sealing contact with the nozzle members. Furthermore, the time which is required to change one, several or all the flights each time they are worn out, is substantial because it implies to stop the entire equipment, which should be avoided.

Returning now to the features of the molds hereinabove referred to, it is not possible to make an analysis with regard to what is already known in this field because the requirements which must be fulfilled by the molds of the present invention were not needed in industry so far.

SUMMARY OF THE INVENTION

Accordingly, the present invention relates to a mold structure and conveying means therefor where the mold structure is preferably used for producing sweets such as chocolate tablets, the core of which is defined by a foamed chocolate mass and the mold structures have to be conveyed through tubular nozzle members in a sealed inclosure by means of said conveying means, said mold structure comprises a base portion defining a main plane of the structure, said base portion being provided with zones defining receiving cavities for the mass to be molded and a frame surrounding said base portion and being integral therewith, said frame having a free edge projecting beyond the lowermost zone of said base portion and defining a plane substantially parallel to said main plane, the corner portions of said frame below said base portion being reinforced by corner columns defining a common plane with said free edge and being arranged within the zone defined by said frame below said base portion, and rail supporting members supporting narrow sliding rails projecting out of the plane defined by said free edge, said endless conveying means consisting of two flexible, spaced apart dragging members, cross-wise supporting spaced apart sealing assemblies, in between each pair of which one of said mold structures may be housed, each sealing assembly comprises a series of resilient wearable, pressure expandable, heat insulating partition members, one adjacent the other, defining a sealing body and the periphery of which substantially agrees with the internal cross-sectional area of said tubular nozzle members, a pair of backing plates each one backing up respectively the front and rear face of said sealing body, said backing plates being hard and thin and the area of which is less than that of the front and rear faces of said sealing body so that the edges of said backing plates are spaced apart from the edges of the pertinent partition members, and adjustable clamping means passing through said backing plates and sealing body and capable of exerting a compressive pressure on the sealing assembly formed by said backing plates and partition members forming said sealing body, said two flexible spaced apart dragging members passing through said sealing assembly in the marginal zones thereof but being spaced apart from the edges of said sealing assembly and being anchored to said assembly.

It will be readily understood that the mold structure and sealing means operate in combination to provide the desired result.

BRIEF DESCRIPTION OF THE DRAWINGS

In order to facilitate the comprehension of the details of the present invention, reference will now be made, by way of example to a preferred embodiment in relationship to the accompanying drawings, in which:

FIG. 4 is a schematic elevation showing part of a tubular inlet nozzle member in section connected at one end portion to a high vacuum chamber (not shown) and where the sealing means are shown in side view.

FIG. 5 is a perspective view of part of the conveyor means including a pair of chains and the sealing means which latter is partially shown in section to better illustrate the linking means with the pertinent chain.

FIG. 6 shows the rear face of the sealing means in elevation.

Figure 1:
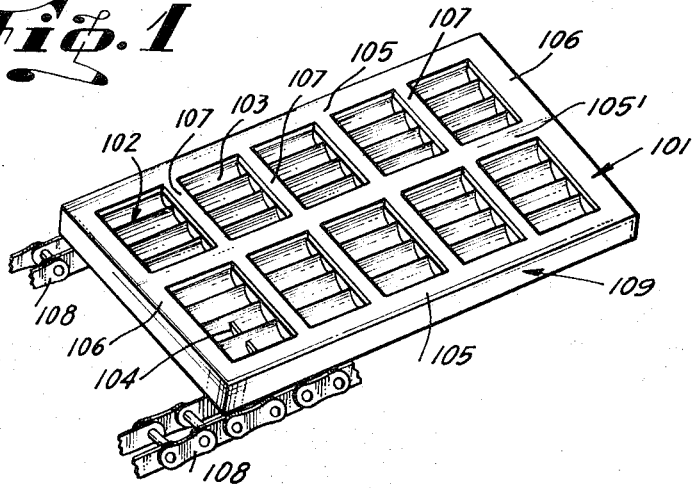
FIG. 1 is a perspective view, seen from above, of a mold structure arranged on a pair of conveyor chains.

7 is a longitudinal section according to line N—N of Figure 6.

DESCRIPTION OF THE PREFERRED EMBODIMENT

In order to better distinguish the features of the mold structure from those of the conveying means, for the mold structure reference numerals with the prefix "100" and for the conveying means, reference numerals with the prefix "200" have been used. Those references which are of lower units are merely applied to means which facilitate the explanation of the invention, but do not actually form part of the invention.

Figure 2:
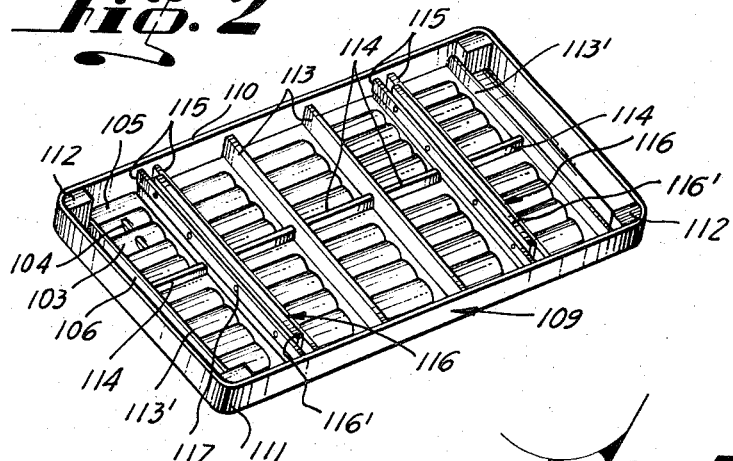
FIG. 2 is a perspective view of the same mold of FIG. 1 which has been rotated through 180° to show the bottom portion of said mold.

The mold structure defines a parallelepipedic rectangular body such as shown in FIG. 2 and comprises a base portion 101 defining a main plane of the structure. This base portion comprises in the embodiment shown ten cavities 102, each capable of producing a chocolate tablet and each tablet consisting of four interconnected ribs shaped by four semi-cylindrical mold portions 103. In two of these semi-cylindrical mold portions the possibility has been shown of providing them with cross-partitions 104 in order to divide each rib into two sections.

The base portion 101 has a flat zone surrounding each cavity 102 and defining the inlet thereof. More particularly, the mold structure shown has two parallel outer main band portions 105 and a middle main band portion 105' crossed by marginal cross-band portions 106 having a larger width than the remaining cross-band portions 107.

Conveniently, the marginal cross band portions 106 have the same width as the outer main band portion 105. The band portions 105, 105'106 and 107 define the main plane of the base portion 101.

These molds are conveyed through a series of working stations and part of the transport may be carried out for example by means of a pair of chains 108 defining an endless conveyor. These chains have a tendency of sliding along the molds thereby wearing out the pertinent marginal portions. This type of transport is as such known and does not form part of the present invention.

The outer main band portions 105 and the marginal cross band portions 106 are integral with a frame 109, the free edge portions 110 projecting beyond the lowermost portion of said base portion 101 and which lowermost portion is defined by the bottom portions of the semi-cylindrical mold portions 103. The free edge portions 110 define a plane which is substantially parallel to the main plane defined by band portions 105, 105'106 and 107. The corner portions 111 of said frame 109 are those which are subject to wear and tear by chains 108 and are therefore reinforced below said base portion 101 by corner columns 112 defining a common plane with said free edge portion 110. These corner columns 112 are rigidly connected to said frames 109 and abut against the corner zones formed by the overlapping portions of band portions 105 and 106. Accordingly, the cross sectional area of each corner column 112 is substantially equal to the one defined by the overlapping band portions 105 and 106, at each corner.

To reinforce the frame 109, to better resist impacts, it further includes a rib grid including cross ribs 113, 113', the heights of which are smaller than that of the frame 109 and which are arranged in the zone corresponding to the band portions 107 and a longitudinal rib 114 located in the zone corresponding to band portion 105'. Ribs 113' are furthermore connected to columns 112 to thereby cooperate in providing the shock proof rigidity for the mold.

Figure 3:
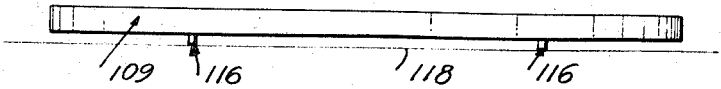
FIG. 3 is a lateral side view of the mold arranged to slide on a runway.

Finally, parallel to ribs 113 and arranged in the zones corresponding to the outermost bands 107 are pairs of rail support members 115, the height of which is likewise smaller than that of the frame 109. Each pair of rail support members 115 support a narrow rail 116 riveted to said rail support members 115 by rivets 117. The sliding surfaces 116' of said rails 116 project out of the plane defined by said free edge 110 whereby the mold may slide along a runway 118 (FIG. 3) creating a minimum of frictional resistance.

The rails 116 are preferably made of leather strips, strips of leather-like material, or material having the consistency of leather. All ribs 113, 113', 114, 115 are integral with the frame 109 and the lower face of base portion 101 as shown in FIG. 2.

The conveyor means of the present invention for conveying the molds through zones at different pressures are generically identified by reference numeral 13 in FIG. 5. These endless conveyor means consist actually of a pair of spaced apart chains 201, supporting spaced apart sealing means 202 crosswise arranged with regard to the longitudinal path defined by the pair of chains 201 and 201'. More particularly, each sealing means 202 consists of a series of flexible, wearable, pressure expandable, heat insulating partition members such as the thick leather partition members 203, 204, 205, the periphery of which corresponds to the cross sectional area of the nozzle member 11. These partition members are arranged in side by side relationship and define a sealing body.

A hard thin backing plate 206, 206' is attached to each of the outer partitions 203 and 205. The area of each backing plate 206, 206' is smaller than the pertinent partition members so that said backing plates will not enter in frictional engagement with the nozzle member 11. Backing plates 206 and 206' are preferably made of metal.

A series of screw and nut arrangements 207 defining adjustable pressure exerting or clamping means are located in the just described assembly between the pair of chains 201 and 201' or the like flexible dragging means. Coupling pins 208 are mounted in the outer portions of the sealing means 202 and the chains 201, 201' are pivotally linked thereto. The rear end portion of each coupling pin 206 is provided with an abutting disc 209 of larger diameter than the pertinent perforations through which the pins 208 pass and are in abutting contact with the rear plate 206. The chains 201 and 201' are pivoted to projecting tongue portions 210 of pins 208. Plates 206 and 206' are each provided, near the chains, with pushing ribs 211, 211'.

In view of the foregoing, it will be understood that only the periphery of the leather partitions 203, 204, 205 are in sealing contact with the nozzle member 11. Upon the chains moving in the direction indicated by arrow 212, the abutting discs 209 exert a pushing force on the sealing means 202. The distance existing between each pair of sealing means 202 is slightly larger than the length of each mold and which has been identified in FIG. 5 by reference numeral 1'. In this embodiment mold 1' has semi-cylindrical recessed portions 27 spaced apart by ridge-like projections 28 defining molding cavities surrounded by band like zones 4' defining inlets 4 for the recesses 27. Thus, the sealing means 202 enters in pushing contact with the pertinent mold through the pushing ribs 211, 211'.

The mold becomes thus housed between a pair of chains 201 201' and slides along the bottom portion or runway of the pertinent nozzle member in a substantially sealed inclosure. If the leather partition members 203, 204, 205 become worn out and therefore do not perfectly carry out the sealing, it is sufficient to further fasten the screw and nut arrangements 207, whereby due to the resiliency of the leather partition members, these increase their cross sectional areas and thereby a perfect sealing is again achieved. It will be readily understood that in view of the arrangement hereinabove described, the chains 201 and 201' are so supported that they will not enter in frictional engagement with the nozzle member 11, and while the sealing means 202 support the chains 201, 201', the chains drag along the sealing means 202.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a mold structure for producing sweets, such as chocolate tablets, the core of which is defined by a foamed chocolate mass, said mold structure providing a low friction coefficient to sliding movement and a high impact resistance, said mold structure comprising a base portion including a plurality of band portions defining a main plane of the structure and cavities for receiving the mass to be molded, and a frame surrounding said base portion and being integral therewith, said frame having a free edge projecting beyond the lowermost zone of said base portion including said cavities and defining a plane substantially parallel to said main plane, reinforcing means rigidly connected to said frame to enhance durability of corner portions thereof against impact, and slide rails supported by and depending down from structure connected to said band portions and being spaced from and out of contact with wall portions of each of said cavities, said sliding rails projecting beyond said free edge and ending in a strip having the consistency of leather.

2. A mold structure for producing sweets such as chocolate tablets, the core of which is defined by a foam chocolate mass, and where the mold provides a minimum of friction coefficient for the translatory sliding movement along a support at the same time as protection is provided against impacts, said mold structure comprising a base portion including a plurality of band portions defining a main plane of the structure and cavities for receiving the mass to be molded and a frame surrounding said base and being integral therewith, said frame having a free edge projecting beyond the lowermost zone of said base portion including said cavities and defining a plane substantially parallel to said main plane, corner posts rigidly connected to said frame below said base portion and extending flush with the free edge, reinforcing means disposed within said band portions and in the space defined by said frame and rigidly connected to said base portion, frame and corner posts, said reinforcing means including rib members supporting parallel slide rails spaced from and out of contact with wall portions of each of said cavities and projecting beyond said free edge, said rails being of a material having the consistency of leather.

3. The mold structure as claimed in claim 1, wherein the corner portions are pairwise linked by cross ribs, the height of which is less than that of the frame and said cross ribs are furthermore connected to said base portion.

4. The mold structure as claimed in claim 3 wherein said receiving cavities are spaced apart by flat band portions defining inlets of said cavities and a reinforcing rib grid integral with said base portion on the face opposite to said inlet and in the zones corresponding to said bands, the height of the ribs of said grid being less than the height of said frame.

5. The mold structure as claimed in claim 4, wherein said rail supporting structure being formed of pairs of ribs in between which one of said narrow sliding rails is fit.

6. The mold structure as claimed in claim 5, wherein said rails are riveted to said grids.

7. The mold structure as claimed in claim 5, wherein said rails are made of leather.

8. The mold structure as claimed in claim 1 wherein said structure further comprises a grid arrangement of rib elements extending laterially and longitudinally of said mold, but free of said cavities, thereby enhancing the impact resistance of said frame.

* * * * *